United States Patent [19]

Shibata et al.

[11] Patent Number: 5,004,497

[45] Date of Patent: Apr. 2, 1991

[54] FRICTION MATERIAL

[75] Inventors: Katsuhiro Shibata; Yuichi Azuma; Tsuguya Suzuki, all of Saitama, Japan

[73] Assignee: Honda Giken Kogyo Kabushiki Kaisha, Tokyo, Japan

[21] Appl. No.: 406,394

[22] Filed: Sep. 12, 1989

[30] Foreign Application Priority Data

Sep. 12, 1988 [JP] Japan .................. 63-228079

[51] Int. Cl.$^5$ .............................. B22F 1/00
[52] U.S. Cl. ...................... 75/229; 75/243; 75/246; 523/152; 523/156
[58] Field of Search ............ 523/152, 156; 75/243, 75/229, 246

[56] References Cited

U.S. PATENT DOCUMENTS

| 4,373,037 | 2/1983 | Washabaugh | 523/155 |
| 4,373,038 | 2/1983 | Moraw et al. | 523/156 |
| 4,374,211 | 2/1983 | Gallagher et al. | 523/156 |
| 4,735,975 | 4/1988 | Iwata et al. | 523/152 |

Primary Examiner—Stephen J. Lechert, Jr.
Assistant Examiner—Nina Bhat
Attorney, Agent, or Firm—Skjerven, Morrill, MacPherson, Franklin & Friel

[57] ABSTRACT

A friction material containing 0.85 to 30% by weight of carbon fibers and 2 to 20% by weight of aramid fibers for use as brake pads, brake linings, clutch facings and other mechanical component parts which are subjected to severe frictional contact with other mechanical component parts. The aramid fibers preferably consist of para-aramid fibers and/or a combination of chopped aramid fibers and fibrillar aramide fibers. There is a certain preferred range for the ratio between the aramid fiber content and the carbon fiber content. This friction material offers advantages in a high-temperature stability of the coefficient of friction, a favorable wear property, freedom from sticking and uneven wears, and superior anti-fade properties.

8 Claims, 4 Drawing Sheets ns
FRICTION MATERIAL

TECHNICAL FIELD

The present invention relates to a friction material for use as automotive brake linings, disk brake pads, clutch facings and so on.

BACKGROUND OF THE INVENTION

In recent years, carbon fibers and aramid fibers have come to be preferred over asbestos as fiber materials for use in friction materials such as automotive disk brake pads, clutch facings and so on, as they are superior in their anti-fade property over asbestos and have favorable wear properties, and one such example is proposed in Japanese patent laid open publication No. 55-104378.

However, aramid fibers are now available in a wide range of physical and chemical specifications, and these factors may affect various properties of the friction materials in regards to facility of molding, uniformity of the distributions of ingredients which may become a cause of uneven wear, and durability of the friction materials after being molded. For instance, para-aramid fibers are superior over meta-aramid fibers in heat resistance. Furthermore, since these factors affect the various properties of the friction material in such a complex manner that it is not trivial to obtain a desired friction material by varying the mixing ratio of different fiber materials. In short, since various factors related to the fiber contents of a friction material could affect its properties in highly unpredictable manner, it is extremely difficult to predict the properties of the final frictional material without carrying out extensive experiments.

BRIEF SUMMARY OF THE INVENTION

Based upon such a recognition and in view of the problems of the conventional friction materials, a primary object of the present invention is to provide a friction material having a favorable fade property.

A second object of the present invention is to provide friction material which has a favorable molding capability.

A third object of the present invention is to provide a friction material which is durable in use.

According to the present invention, these and other objects of the present invention can be accomplished by providing a friction material, comprising: 0.85 to 30% by weight of carbon fibers; and 2 to 20% by weight of aramid fibers consisting of a mixture of pulpous or fibrillar fibers and chopped fibers; AF<1.67 CF where AF is the aramid fiber content by weight and CF is the carbon content by weight.

The fibrillar aramid fibers improve the durability of the friction material after it is molded, and its tentacle-like projections catch chopped aramid fibers, carbon fibers, and other fillers so as to evenly distribute the fibers and prevent excessive bulk increase. The chopped aramid fibers also improve the durability of the friction material after it is molded. Further, by selecting the ratio of the aramid fiber content by weight to the carbon fiber content to be less than 1.67, the fade property of the friction material is improved.

For using this friction material as a brake pad for a disk brake, it is preferred that AF<0.5 CF+10 so that the brake pad may have a favorable rigidity as felt by the person who steps on the brake pedal.

By using para-aramid fibers as the aramid fibers, the heat resistance of the friction material is improved, and its durability against wear and cracks is improved.

According to a preferred embodiment of the present invention, the friction material further comprises 10 to 50% by weight of at least one substance selected from the group consisting of copper, nickel, copper-zinc alloy, iron and copper-tin alloy; 5 to 20% by weight of at least one substance selected from the group consisting of graphite, molybdenum disulfide, zinc sulfide, lead sulfide, antimony trisulfide, mica and boron nitride; 10 to 50% by weight of a combination of at least one substance selected from the group consisting of silicon dioxide, alumina, mulite, magnesia (MgO), zirconium oxide and Spinel-structured ferrite ($Fe_3O_4$) and at least one substance selected from the group consisting of barium sulfate, calcium carbonate and cupric oxide; 3 to 20% by weight of at least one substance selected from the group consisting of melamine dust, polyimide dust, cashew dust and phenol dust; and 8 to 15% by weight of phenol resin.

BRIEF DESCRIPTION OF THE DRAWINGS

Now the present invention is described in the following in terms of specific embodiments with reference to the appended drawings, in which.

DETAILED DESCRIPTION OF THE PREFERRED EMBODIMENTS

Figure 1:
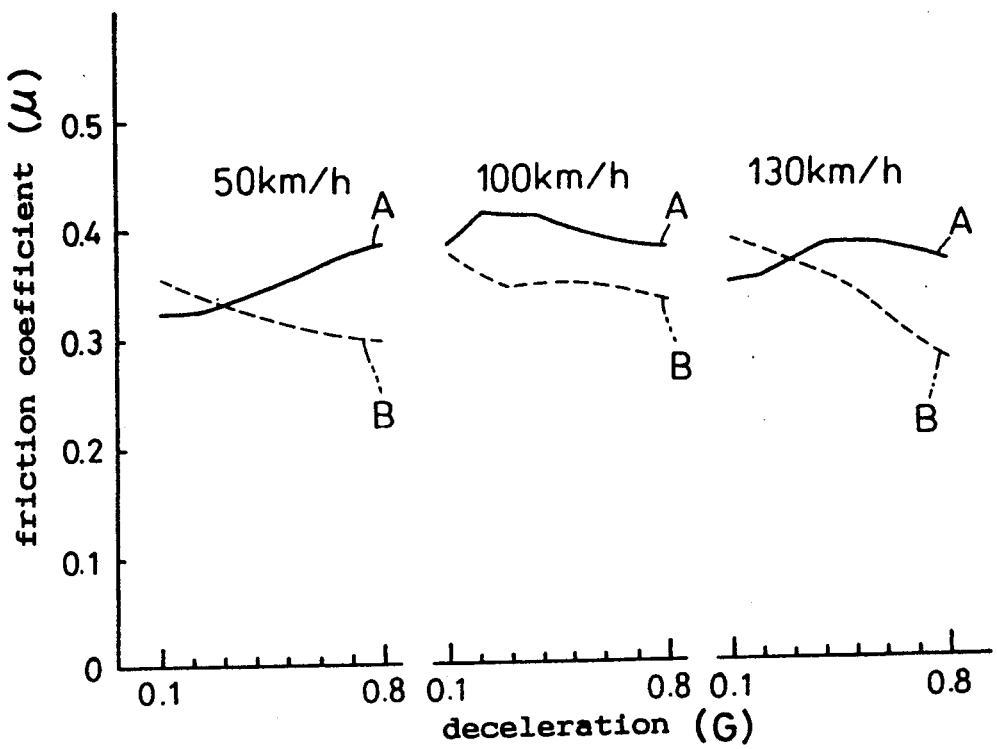
FIGS. 1 through 3 are graphs showing the results of the brake tests according to JASO (Japanese Automobile Standards Organization) C 406-82 conducted on brake pads made of the friction material according to the present invention.
Figure 3:
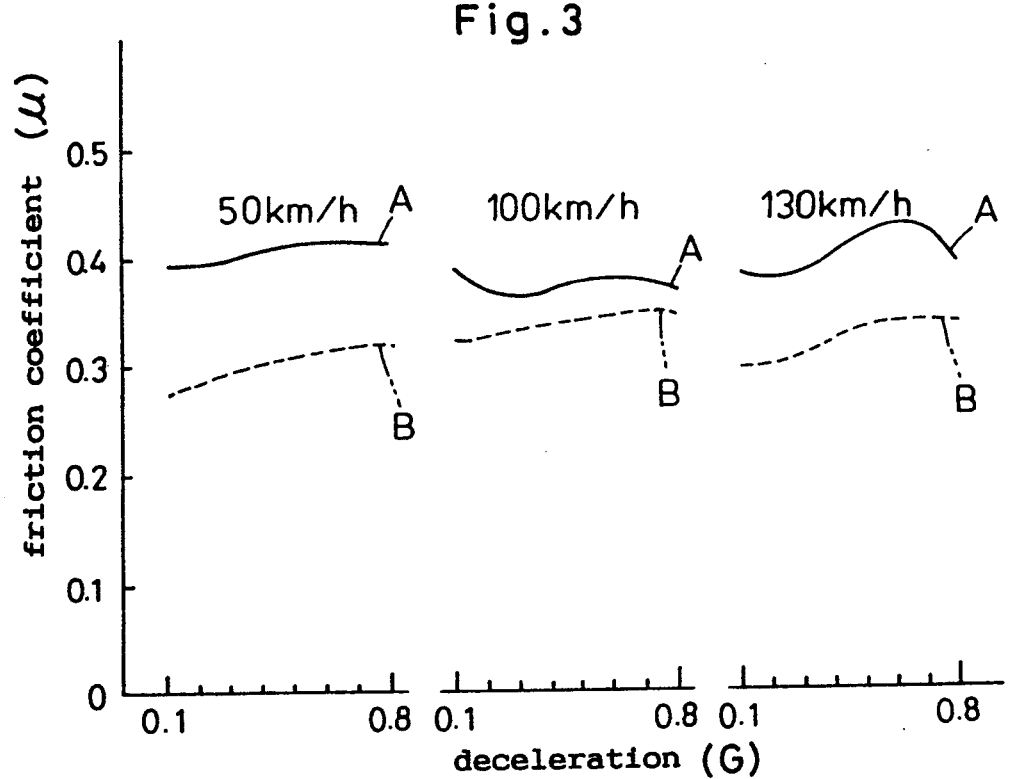
Figure 2:
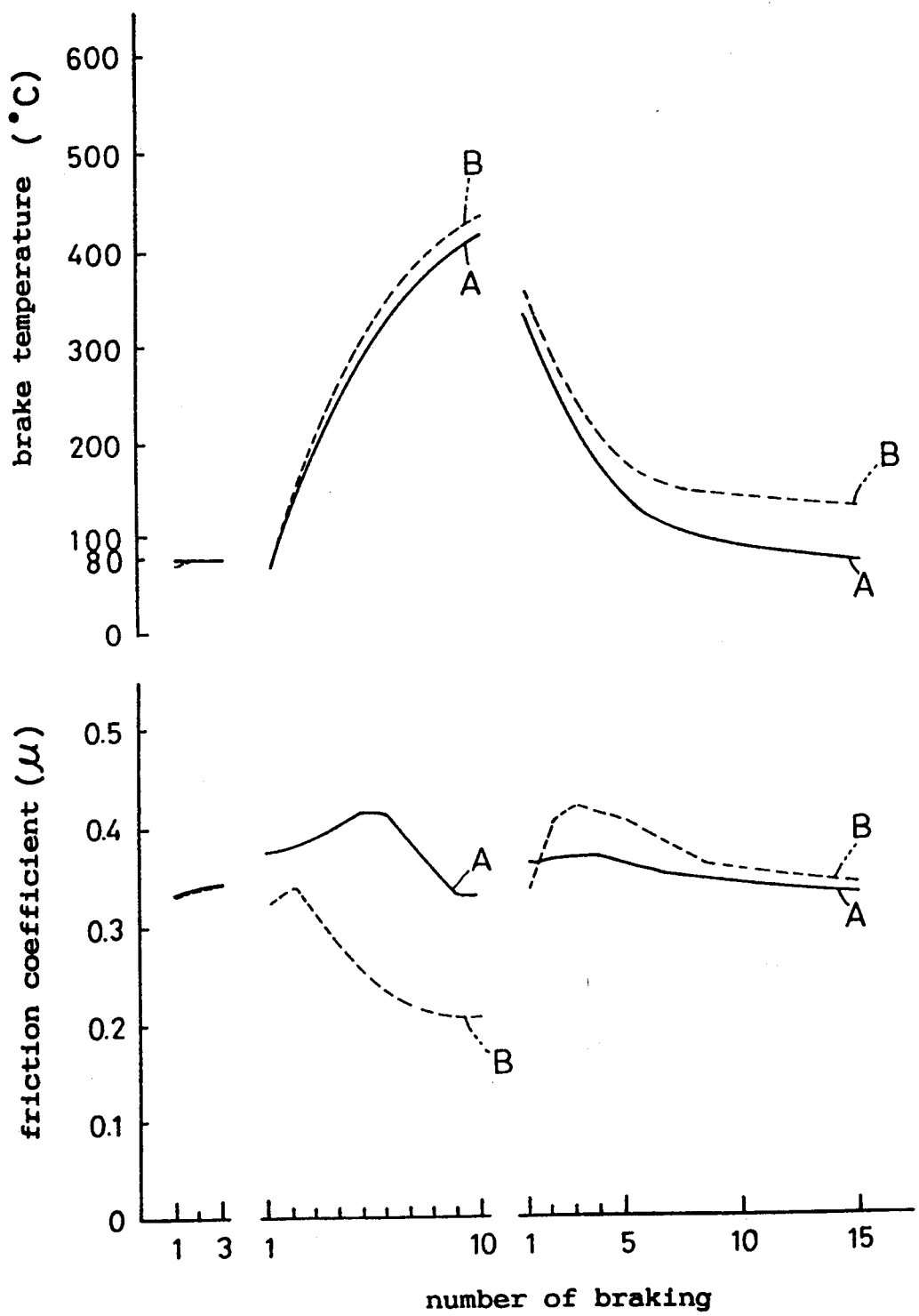

FIGS. 1 through 3 are graphs comparing the results of brake tests conducted on a brake pad using the friction material according to the present invention and a brake pad using a conventional friction material containing asbestos, according to the automobile brake device dynamo meter testing method prescribed in JASO C 406-82.

The brake pad consisting of the friction material of the present invention comprises the following ingredients; 5.3% by volume of fibrillar aramid fibers, 2.7% by volume of chopped aramid fibers which are 7 micrometers in diameter and 3 millimeter in length, 6.0% by volume of carbon fibers which are 6 micrometers in diameter and 3 millimeters in length, 6.0% by volume of copper powder and 9.0% by volume of copper-zinc alloy powder for increasing the friction coefficient, 5.0% by volume of graphite and 8.0% by volume of molybdenum disulfide to prevent sticking between the brake rotor and the metallic powder, 5.4% by volume of silicon dioxide as high-hardness inorganic filler serving as a cleaner of the rotor, 12.6% by volume of barium sulfate as relatively low-hardness inorganic filler for preventing wear of the pad in high temperature condition, 16.0% by volume of melamine dust as an organic filler for stabilizing the friction coefficient in lower surface pressure condition, 23.0% by volume of phenol resin as a binder, and 1.0% by volume of a pH controller. The aramid fibers used in the present embodiment consist of para-aramid fibers commercially marketed under the tradename "Kevlar 49" by duPont Neymour. The carbon fibers used in the present embodiments consist of heat resistant and high strength PAN carbon fibers which are commercially marketed under the tradename "Torayca T300" by Toray Corporation of Japan.

The brake pad consisting of the conventional friction material, on the other hand, contains 20.% by weight of asbestos fibers, 1.0% by weight of calcium carbonate, 32.5% by weight of barium sulfate, 23.0% by weight of a mixture of cashew dust and phenol resin, 20.0% of copper powder, 0.5% by weight of zinc powder, and 3.0% by weight of iron powder.

Initial measurements, inspection before running-in, a first effectiveness test, running-in, and a second effectiveness test were conducted according to the specifications of JASO (category P1). Specifically, the brake temperature (the temperature of the brake pad 1 mm below its contact surface) as measure before braking was set at 80 degrees C, and coefficients of friction ($\mu$) were obtained from the measurements of braking torques from different initial speeds of 50 km/h, 100 km/h and 130 km/h at various braking decelerations in the range of 0.1 to 0.8 G (FIG. 1).

Then, a first fade recovery test was conducted. Specifically, the brake temperature before braking was set at 80 degrees C, and the base line of the coefficient of friction ($\mu$) was checked by activating the brake three times from the initial braking speed of 50 km/h at the constant braking deceleration of 0.3 G (or constant pressure condition equivalent to the 0.3 G condition).

It was followed by a fade test. Specifically, the first brake temperature before braking was set at 60 degrees C, and brake temperature and the coefficient of friction ($\mu$) were obtained by activating the brake fifteen times at the interval of 120 seconds from the initial braking speed of 50 km/h at the constant braking deceleration of 0.3 G (or constant pressure condition obtained from the checking of the base line) (FIG. 2).

Thereafter, as a third effectiveness test, the coefficient of friction ($\mu$) was obtained under the same condition as the second effectiveness test (FIG. 3).

As shown in FIG. 2, a brake pad (solid line A) using the friction material of the present invention involved less change in the coefficient of friction ($\mu$) due to the changes in the temperature of the brake than another brake pad (broken line B) using the conventional friction material. Further, as shown in FIGS.1 and 3, the brake pad using the friction material of the present invention (solid line A) involved less change in the coefficient of friction due to thermal hysteresis than the brake pad using the conventional material (broken line B).

Carbon fibers having a high thermal conductivity were used in the present embodiment. This contributed to the prevention of vapor locking of the brake when combined with aramid fibers having a low thermal conductivity but also, because the aramid fibers consisted of para-aramid fibers having better heat resisting properties (durability against wear and cracks) than meta-aramid fibers, to improvements in the heat resisting properties, the durability and the antifade property of the friction material.

Para-aramid fibers improved the durability of the friction material and promoted even distribution of carbon fibers, which tend to segregate, by catching the carbon fibers with their tentacle-like projections.

Chopped para-aramid fibers reduce the tendency of the friction material to attack the brake rotor and improves the durability of the friction material even further. However, since para-aramid fibers have a high durability, a sufficient durability of the friction material may be obtained without using any chopped aramid fibers.

PAN carbon fibers contribute to the stabilization of the coefficient of friction of the friction material at high temperature. The PAN carbon fibers should be less than 15 micrometer in diameter in order to ensure a sufficient reinforcing effect. To ensure a sufficient reinforcing efficacy and even distribution of carbon fibers, they should be between 0.5 mm and 9.0 mm in length.

The friction material of the present embodiment contains a mixture of fibrillar para-aramid fibers and chopped aramid fibers by 8.0% by weight, but its content may be anywhere between 2 and 20%. When the aramid fiber content is less than 2% by weight, molding of a preform would become difficult. If the aramid fiber content is more than 20%, the coefficient of friction ($\mu$) at high temperature would drop.

Figure 5:
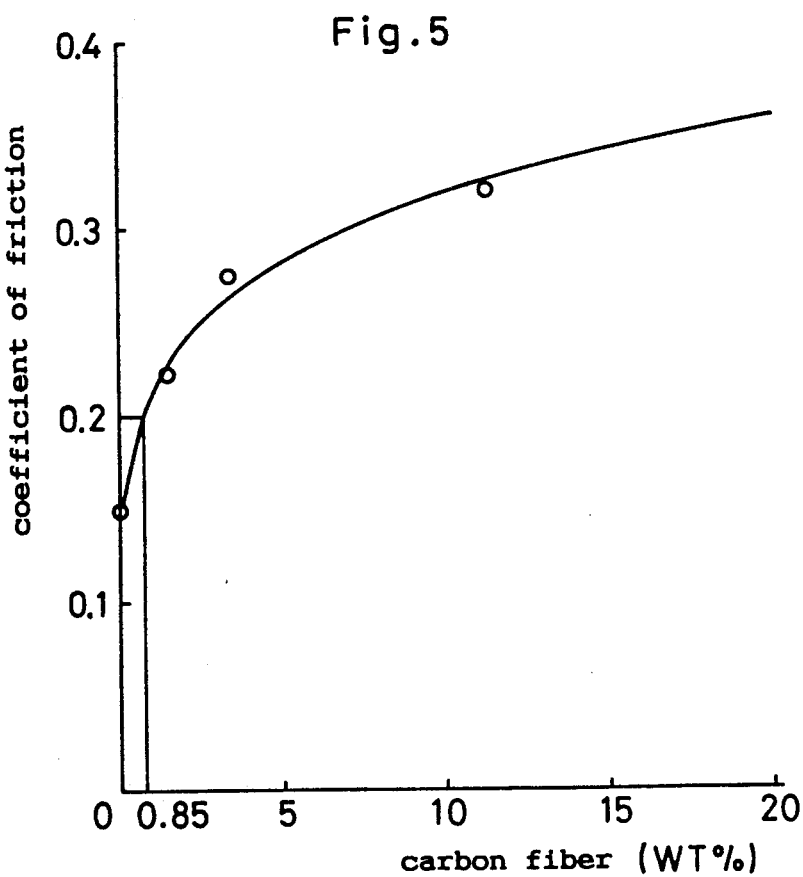
FIG. 5 is a graph showing the relationship between the coefficient of friction and the carbon fiber content in high speed braking condition (200 km/h)

The friction material of the present embodiment contained 6.0% by weight of PAN carbon fibers, but the carbon fiber content may be anywhere between 0.85 and 30% by weight. If the carbon fiber content is less than 0.85%, the coefficient of friction of the friction material would drop below 0.2 which is considered to be a practical lower limit of the coefficient of friction. This is shown in the graph of Fig.5 showing experimentally obtained plots in high speed braking condition (200 km/h) and a curve obtained by interpolating these points with a mathematical function in the form of $Y = A \times X^B$ where Y is the coefficient of friction, B is the carbon fiber content by weight, and A and B are constants (A=0.210 and B=0.179). However, the carbon content is desired to be more than 3% to stabilize the coefficient of friction at high temperature. On the other hand, if the carbon fiber content is more than 30% by weight, the coefficient of friction at normal operating temperature drops.

The friction material of the present embodiment contained metallic powder consisting of a mixture of copper powder and copper-zinc alloy powder, but may contain 10 to 50% by weight of at least one substance selected from the group consisting of copper, nickel, copper-zinc alloy, iron and copper-tin alloy. If the metallic powder content is less than 10% by weight, its efficacy to increase the coefficient of friction is substantially lost. On the other hand, if the metallic powder content exceeds 50% by weight, local adhesions may occur between the friction material and the brake rotor, and judders may be generated.

The friction material of the present embodiment contained graphite and molybdenum disulfide as solid lubricants, but it suffices if the friction material contains 5 to 20% by weight of at least one substance selected from the group consisting of graphite, molybdenum disulfide, zinc sulfide, lead sulfide, antimony trisulfide, mica and boron nitride. If the solid lubricant content is less than 5% by weight, the efficacy to prevent adhesion between the metallic powder and the brake rotor is virtually lost. On the other hand, if the solid lubricant content exceeds 20% by weight, the coefficient of friction drops.

The friction material of the present embodiment contained silicon dioxide as a high-hardness inorganic filler and barium sulfate as a low-hardness inorganic filler, but it suffices if the friction material contains 10 to 50% by weight of a combination of at least one substance selected from the group consisting of silicon dioxide, alumina, mulite, magnesia (MgO), zirconium oxide, and Spinel-structured ferrite ($Fe_3O_4$), as a high-hardness inorganic filler, and at least one substance selected from the group consisting of barium sulfate, calcium carbonate and cupric oxide as a low-hardness inorganic filler. If the content is less than 10% by weight, the efficacy to clean the brake rotor, and to reduce the wear of the pad and the drop in the coefficient of friction are virtually lost. On the other hand, if the content exceeds 50% by weight, the tendency of the brake pad to attack the brake rotor becomes excessive, and the brake rotor may wear out unevenly.

The friction material of the present embodiment contained melamine dust as an organic filler, but it suffices if the friction material contains 3 to 20% by weight of melamine dust, polyimide dust, cashew dust and/or phenol dust. If the content is less than 3% by weight, the efficacy to stabilize the coefficient of friction in low surface pressure condition is virtually lost. If the content exceeds 20% by weight, the coefficient of friction at high temperature drops.

The content of phenol resin serving as a binder in the friction material of the present embodiment may be 8 to 15% by weight for practical purpose. If the phenol resin content is less than 8% by weight, its efficacy as a binder is virtually lost. On the other hand, if its content exceeds 15% by weight, the coefficient of friction at high temperature drops.

Figure 4:
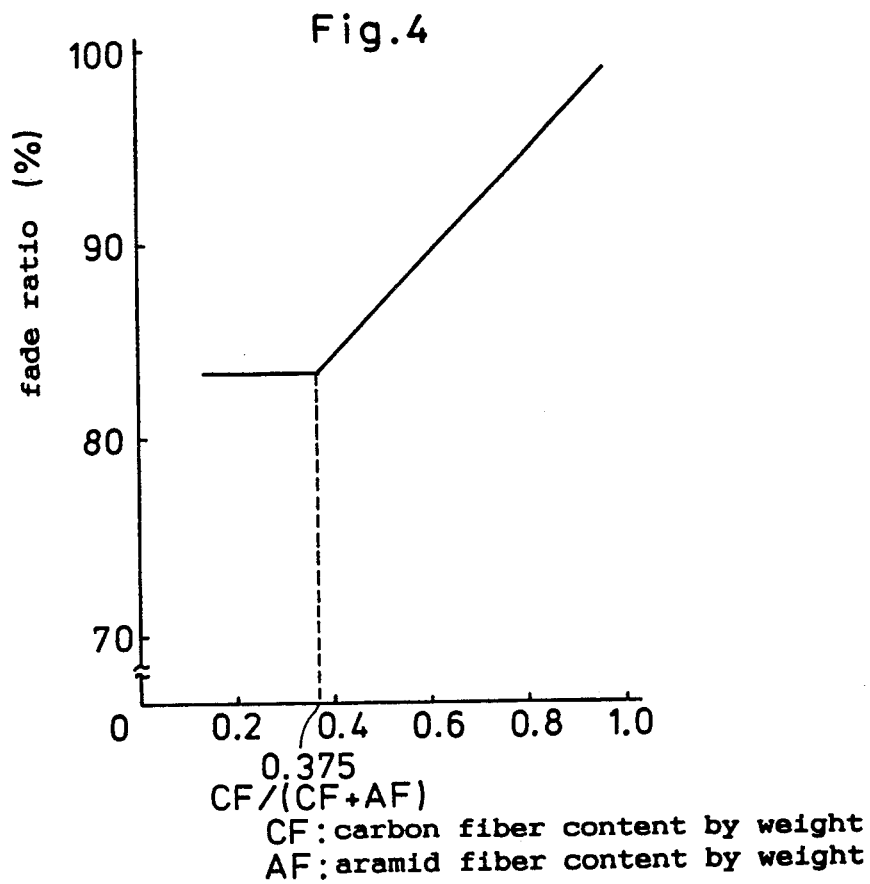
FIG. 4 is a graph showing the relationship between the ratio of carbon fibers to the aramid fibers in the fiber content of the friction material according to the present invention and the fade ratio.

FIG. 4 is a graph showing the changes in the fade ratio obtained from the brake tests which were conducted according to JASO C 406-82 for different mixture ratios of carbon fibers and aramid fibers in the friction material according to the present invention. The samples used in these tests contained 5.2% by volume of graphite (natural graphite), 17.7% by volume of melamine dust, 8.3% by volume of copper powder, 15.6% by volume of barium sulfate, 2.1% by volume of silicon dioxide, 2.1% by volume of alumina, 7.3% by volume of cupric oxide, 3.1% by volume of nickel, and 26.1% by volume of phenol resin. The total content of aramid fibers and carbon fibers is fixed at 12.6% by volume, and the ratio between the aramid fibers and the carbon fibers was varied within such a range as the content of aramid fibers is between 2 and 20% by weight and the content of carbon fibers is between 3 and 30% by weight of the entire weight of the friction material.

The horizontal axis of the graph in FIG. 4 corresponds to the weight ratio of the carbon fibers to the sum of the weight ratio of the aramid fibers and the weight ratio of the carbon fibers, and the vertical axis represent the fade ratio. The fade ratio was derived according to the following formula:

fade ratio = $\mu_{min}/\mu_{max}$ where $\mu_{min}$ and $\mu_{max}$ are the minimum value and the maximum value of the coefficient of friction measured by the brake tests, respectively, according to the relationship:

$T = 2\mu PSr$ where T represents braking torque, P represents the fluid pressure in the brake cylinder, S represents the cross sectional area of the caliper piston, and r represents the effective radius of the brake rotor.

Figure 7:
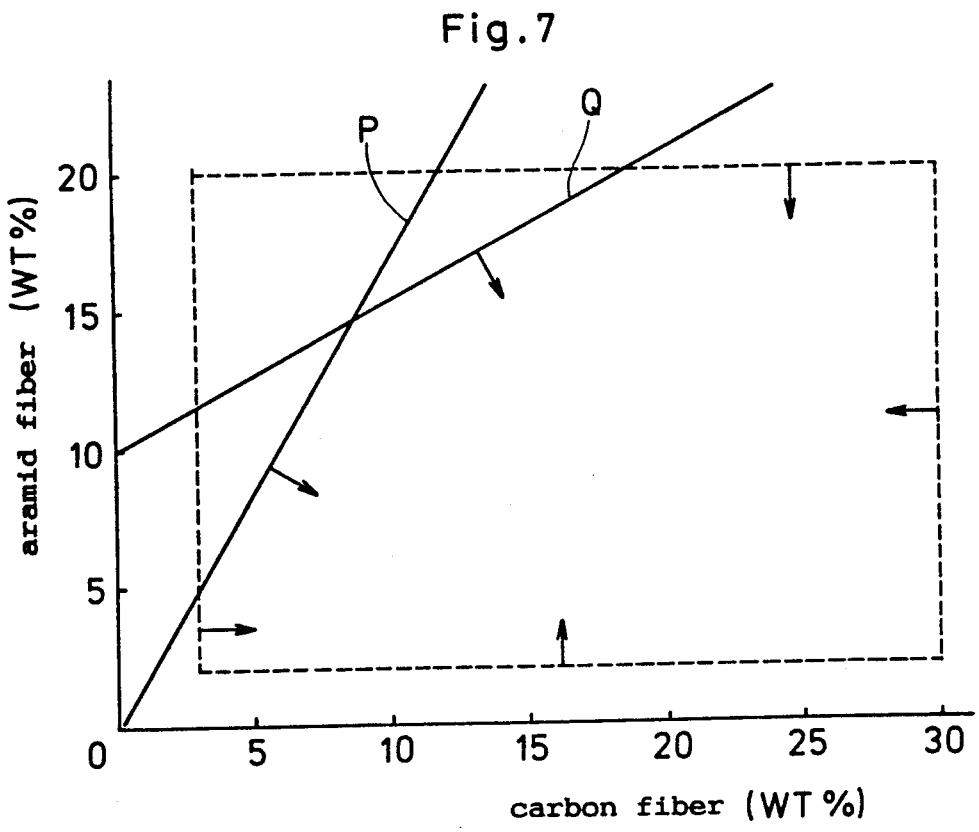
FIG. 7 is a graph showing a desirable range of the contents of carbon fibers and aramid fibers in the friction material according to the present invention.

As shown in FIG. 4, it can be seen that, when the weight ratio of the carbon fibers in the entire fiber content exceeds 0.375 or, in other words, weight of the carbon fibers exceeds 0.6 times of that of the aramid fibers, the fade ratio of the friction material increases significantly. Therefore, favorable fade ratios can be obtained in the region enclosed by a broken line R and a solid line P in the graph of FIG. 7 in which the carbon fiber content in the friction material is represented in the vertical axis and the aramid fiber content in the friction material is represented in the horizontal vertical axis.

Another requirement for a brake pad is its rigidity. A brake pad is desired to be provided with a high Young's modulus so that the person stepping on the brake pedal may get a comfortable solid feeling. Since carbon fibers have a relatively high Young's modulus whereas aramid fibers have a relatively low Young's modulus, the mixture ratio of these two kinds of fibers affect the overall Young's modulus of the friction material. For instance, the rigidity of a brake pad may be evaluated by the following formula:

$$0.1 \times CF - 0.2 \times AF + 7$$

where CF is the carbon fiber content in percent and by weight and AF is the aramid fiber content in percent and by weight. In order to obtain a favorable impression, this index should be equal to 5 or higher. This is indicated by line Q in FIG. 7.

Figure 6:
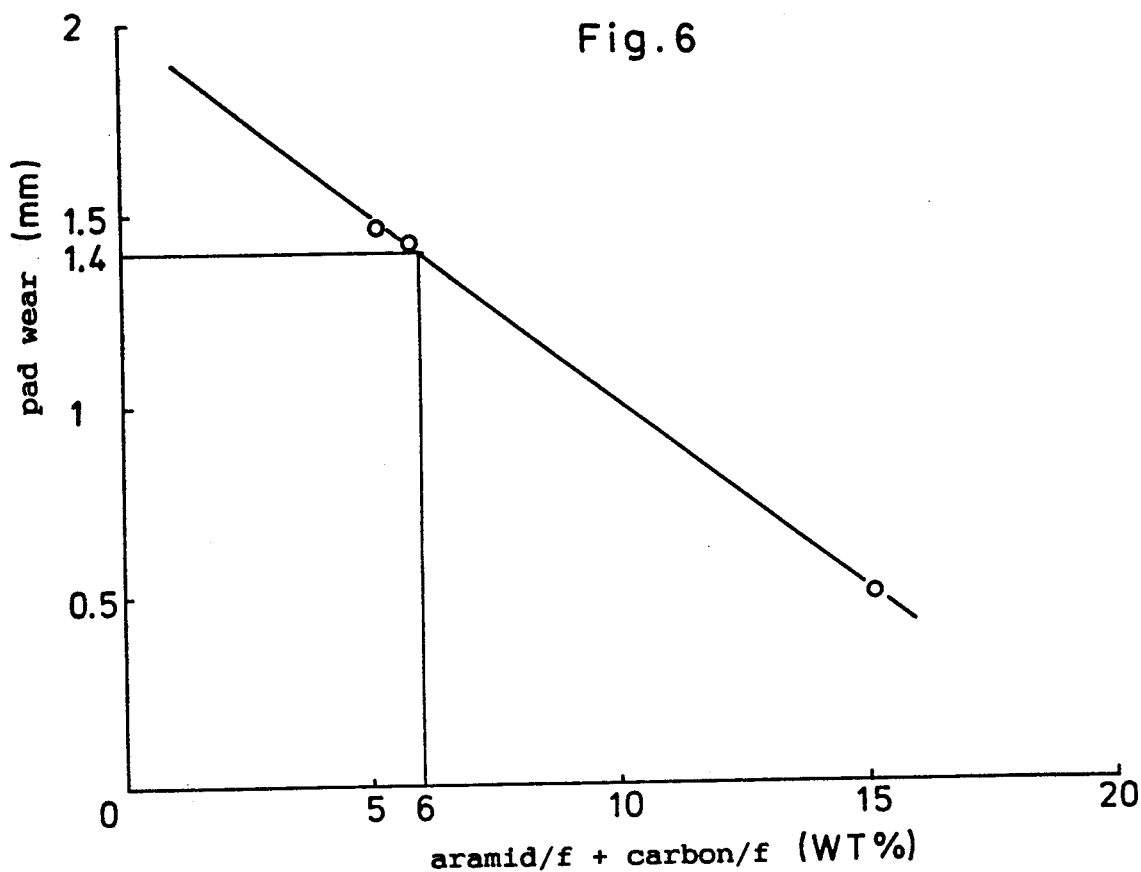
FIG. 6 is a graph showing the relationship between the total fiber content (aramid fibers and carbon fibers) and the extent of the wear of the pad after the brake tests according to JASO C 406-82.

It was also found by comparing the wears of the sample brake pads that the total fiber content given as the sum of the aramid fiber content and the carbon fiber content has a linear relationship with the amounts of wear resulting from the schedule of brake tests according to JASO C 406-82 (category P1). As can be seen from the graph of FIG. 6 which shows the results of the comparison of the amounts of wear, the total fiber content should be 6% by weight or more in view of the fact that the wear is desired to be less than 1.4 mm for practical purpose.

Thus, according to the present invention, by using 3 to 30% by weight of carbon fibers, and 2 to 20% by weight of aramid fibers consisting of a mixture of fibrillar fibers and chopped fibers and selecting the weight ratio of the carbon fibers to the aramid fibers so as to be 0.6 or more, the molding capability of the friction material is ensured, fading during the operation of the brake is favorably controlled, and the durability of the frictional material after being molded into a brake pad is improved. Further, by using para-aramid fibers instead of meta-aramid fibers for the aramid fiber content, the heat resisting property of the friction material is improved, and its durability against wearing and cracking is improved. Thus, the present invention offers significant advantages over the prior art.

What we claim is:

1. A friction material, comprising:
   0.85 to 30% by weight of carbon fibers; and 2 to 20% by weight of aramid fibers consisting of a mixture of fibrillar fibers and chopped fibers;

AF<1.67 CF where AF is the aramid fiber content by weight and CF is the carbon content by weight.

2. A friction material according to claim 1, wherein AF<0.5 CF +10.

3. A friction material according to claim 1, wherein the carbon fiber content (CF) is more than 1.0% by weight.

4. A friction material according to claim 1, further comprising:
- 10 to 50% by weight of at least one substance selected from the group consisting of copper, nickel, copper-zinc alloy, iron and copper-tin alloy;
- 5 to 20% by weight of at least one substance selected from the group consisting of graphite, molybdenum disulfide, zinc sulfide, lead sulfide, antimony trisulfide, mica and boron nitride;
- 10 to 50% by weight of a combination of at least one substance selected from the group consisting of silicon dioxide, alumina, mulite, magnesia (MgO), zirconium oxide and Spinel-structured ferrite ($Fe_3O_4$) and at least one substance selected from the group consisting of barium sulfate, calcium carbonate and cupric oxide;
- 3 to 20% by weight of at least one substance selected from the group consisting of melamine dust, polyimide dust, cashew dust and phenol dust; and
- 8 to 15% by weight of phenol resin.

5. A friction material, comprising:
0.85 to 30% by weight of carbon fibers; and
2 to 20% by weight of para-aramid fibers including fibrillar fibers;

AF<1.67 CF where AF is the aramid fiber content by weight and CF is the carbon content by weight.

6. A friction material according to claim 5, wherein AF<0.5 CF +10.

7. A friction material according to claim 5, wherein the carbon fiber content (CF) is more than 1.0% by weight.

8. A friction material according to claim 5, further comprising:
- 10 to 50% by weight of at least one substance selected from the group consisting of copper, nickel, copper-zinc alloy, iron and copper-tin alloy;
- 5 to 20% by weight of at least one substance selected from the group consisting of graphite, molybdenum disulfide, zinc sulfide, lead sulfide, antimony trisulfide, mica and boron nitride;
- 10 to 50% by weight of a combination of at least one substance selected from the group consisting of silicon dioxide, alumina, mulite, magnesia (MgO), zirconium oxide and Spinel-structured ferrite ($Fe_3O_4$) and at least one substance selected from the group consisting of barium sulfate, calcium carbonate and cupric oxide;
- 3 to 20% by weight of at least one substance selected from the group consisting of melamine dust, polyimide dust, cashew dust and phenol dust; and
- 8 to 15% by weight of phenol resin.

* * * * *